July 27, 1954

E. A. GOLDBERG ET AL 2,684,999

STABILIZED DIRECT CURRENT AMPLIFIER

Filed April 28, 1949

INVENTORS
EDWIN A. GOLDBERG &
JULES LEHMANN
BY Morris A. [signature]
ATTORNEY

Patented July 27, 1954

2,684,999

UNITED STATES PATENT OFFICE 2,684,999

STABILIZED DIRECT CURRENT AMPLIFIER

Edwin A. Goldberg, Princeton Junction, and Jules Lehmann, Princeton, N. J., assignors to Radio Corporation of America, a corporation of Delaware Application April 28, 1949, Serial No. 90,072

7 Claims. (Cl. 179—171)

Figures 1, 2, 3:
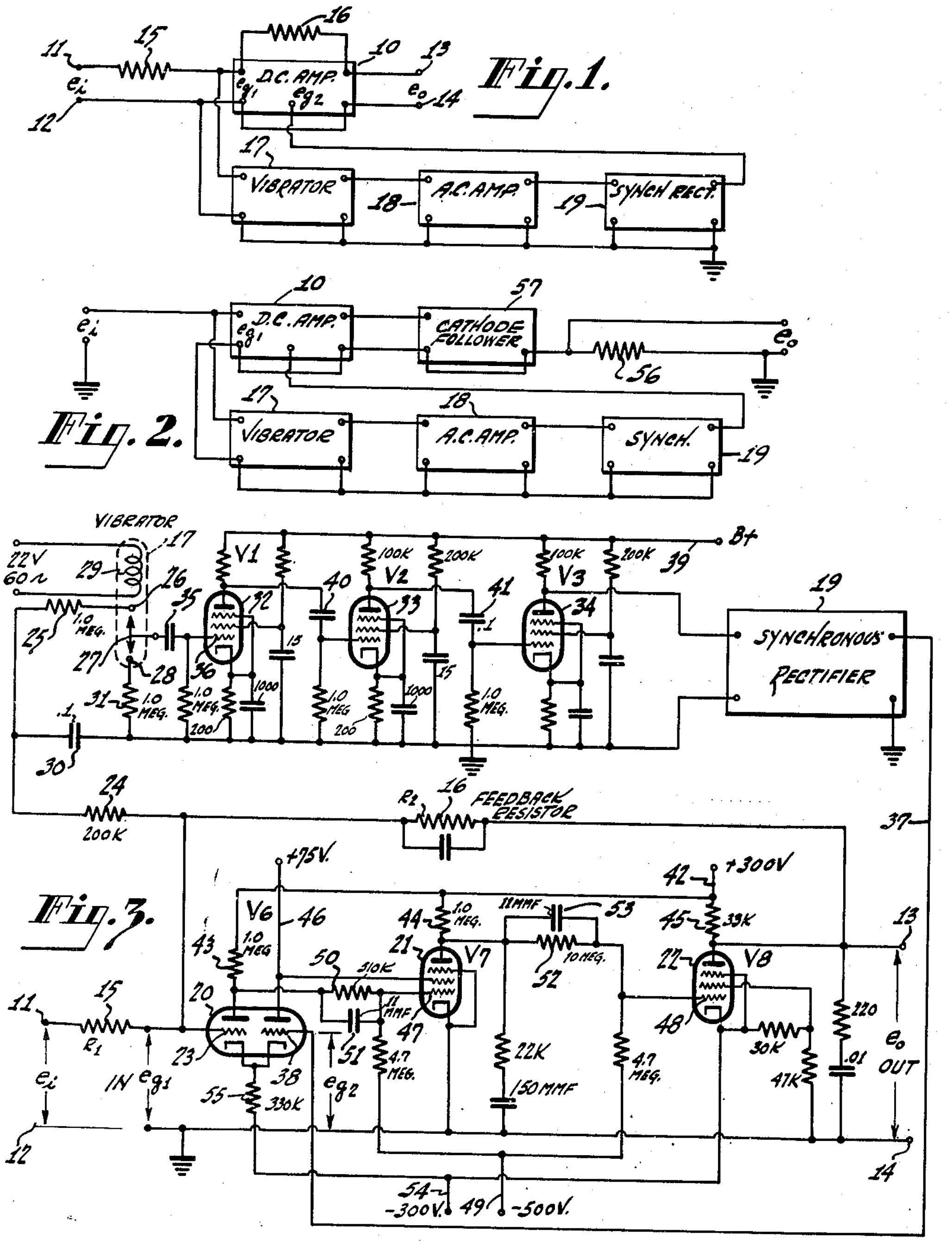

This invention relates to direct current amplifiers, and more particularly to means for stabilizing the drift and automatically setting the zero of such amplifiers so that the output voltage will be zero when the input voltage is zero.

Amplifiers are normally stabilized relatively to gain by means of overall feedback. In the case of D. C. amplifiers, the gain expressed as a ratio of change of output voltage to a change of input voltage may be stabilized by this method, but overall feedback does not insure that the output voltage will be zero for zero input voltage. This adjustment must normally be made manually, and the setting must be changed as a function of time since the tube characteristics change slightly with time. This adjustment is hereinafter called the zero or threshold adjustment. Variations in the required threshold adjustment to insure zero output for zero input are normally quite slow.

The present invention provides means for automatically and continuously stabilizing D. C. amplifiers for zero, drift and gain. Stabilization for gain is accomplished as usual by the use of overall feedback. Stabilization for zero and drift is accomplished by means including a contactor type of modulator which chops the error voltage so that it may be amplified in an A. C. amplifier. The output of this A. C. amplifier is rectified and applied to the D. C. amplifier at a point where the zero setting voltage is normally applied.

As will appear, the amplifier herein described may function as a summing amplifier, a differentiator or an integrator depending on the components of its input and overall feedback circuits.

The principal object of the invention is to provide an improved means and method of operation whereby a D. C. amplifier is continuously and automatically stabilized for gain, zero and drift. A further object is the provision of an improved feedback circuit which is responsive to an error voltage and functions to provide a correction or stabilizing voltage adapted to eliminate the effect of such error voltage.

Another object of the invention is the provision of an improved means which (1) functions to stabilize an amplifier for drift and zero when it is operated as a D. C. amplifier and (2) does not substantially affect the high frequency response characteristics of the amplifier when it is operated as an A. C. amplifier.

The invention will be better understood from the following description considered in connection with the accompanying drawings and its scope is indicated by the appended claims.

Referring to the drawings:

Fig. 1 is a block diagram showing the relation between the various parts of the amplifier, Fig. 2 is a block diagram similarly illustrating a modified form of the amplifier, and Fig. 3 is a wiring diagram of the amplifier of Fig. 1.

Fig. 1 shows an amplifier 10 as provided with input terminals 11 and 12 and with output terminals 13 and 14. A resistor 15 is connected in the input circuit and a resistor 16 is connected in the overall feedback circuit from the output to the input of the amplifier. With these connections, the amplifier is stabilized for gain.

In order to stabilize the amplifier for zero and drift, there is connected between the junction point of the input resistor 15 and feedback resistor 16 and the point to which the correction voltage is to be applied a circuit which includes a vibrator or chopper 17, an A. C. amplifier 18 and a synchronous rectifier 19.

If it be assumed that $e_1$=Input voltage,
$e_o$=Output voltage,
$e_{g1}$=Error voltage, or actual input voltage of the main amplifier,
$e_{g2}$=Zero setting voltage,
$Z_1$=Input series impedance (resistor 15),
$Z_2$=Feedback impedance (resistor 16),
$G_1(W)$=Gain characteristic of the amplifier 10 for $(e_{g1}-e_{g2})$,
$G_2(W)$=Gain characteristic of the stabilizing circuit, and
$F(W)=G_1(W)+G_1(W)\ G_2(W)$, then it follows that $$e_o=-G_1(W)(e_{g1}-e_{g2}) \quad (1)$$

$$e_{g2}=-G_2(W)e_{g1} \quad (2)$$

$$e_o=-e_{g1}\{G_1(W)+G_1(W)G_2(W)\} \quad (3)$$

$$e_o=-e_{g1}F(W) \quad (4)$$

$$e_o=-e_1\frac{Z_2F(W)}{Z_1F(W)+Z_1+Z_2} \quad (5)$$

The factor $G_2(W)$ contains the threshold information. The value of the threshold is a function of the vibrator contact potential and any stray pickup. Both of these factors are made extremely small by careful design and construction.

For low frequencies, $G_2(W)$ is made quite large by incorporating a large gain in the A. C. amplifier 18. This means that the threshold for these frequencies is controlled by the threshold of the vibrator 17. The maximum rate at which the stabilizing network 17—18—19 can adjust the threshold is a function of the frequency of the vibrator. A 60 cycle vibrator has been found to be satisfactory. Since the normal rate of drift of zero is quite small, adequate stabilization is realized in spite of the necessarily low cut-off frequency of $G_2(W)$.

Since $G_2(W)$ is negligible at high frequencies, the gain factor becomes $G_1(W)$, and the analysis of the operation of the amplifier 10 is the same as though it were a normal amplifier without zero and drift stabilization. The zero setting voltage may be inserted in the amplifier 10 anywhere past the point where $e_{g1}$ appears. As explained in connection with Fig. 3, a dual triode with a common cathode resistor may be used for the first stage of the amplifier 10. In this case, the error voltage $e_{g1}$ is applied to one grid and the stabilizing or correction voltage $e_{g2}$ is applied to the other grid.

Fig. 3 shows the amplifier 10 of Fig. 1 as including three stages 20, 21 and 22. The input voltage $e_1$ is applied through the resistor 15 to a first input circuit which includes the grid 23 of the stage 20. The voltage $e_1$ is also applied through resistors 15, 24 and 25 to the fixed contact 26 of the vibrator 17. This vibrator has a contact 27 which is movable between the contact 26 and a contact 28 at a frequency determined by the frequency of the potential applied to its operating coil 29. The contact 28 is coupled to ground through a resistor 31. The condenser 30 is connected between the junction of resistors 24 and 25 and ground to prevent higher frequency components of $e_{g1}$ from reaching the vibrator.

The A. C. amplifier 18 of Fig. 1 is shown in Fig. 3 as including three stages 32, 33 and 34. The vibratory member 27 is coupled through a capacitor 35 to the control grid 36 of the input stage 32. As indicated in connection with Fig. 1, the unidirectional component of the input voltage $e_{g1}$ is chopped by the vibrator 17, is amplified by the A. C. amplifier 32—33—34 and the amplified voltage is rectified by the synchronous rectifier 19 which may be of any suitable type.

The correction or stabilizing voltage $e_{g2}$ appears at the output of the synchronous rectifier 19 and is applied through a lead 37 to a second input circuit of the D. C. amplifier which includes the grid 38 of the stage 20.

Operating potential is applied from a +B lead 39 through separate resistors to the anodes and screen grids of the stages 32, 33 and 34 of the zero and drift stabilizing circuit, and these stages are intercoupled through capacitors 40 and 41.

Operating potential is applied from a +300 v. lead 42 through a resistor 43 to the anode of the left hand triode of the stage 20 of the D. C. amplifier, and through resistors 44 and 45 to the anodes of the stages 21 and 22. From a +75 v. lead 46, potential is applied to the anode of the right hand triode of the stage 20 and to the screen grid of the stage 21. Bias potential is applied to the control grids 47 and 48 of the stages 21 and 22 from a —500 v. lead 49. The stage 20 is coupled to the stage 21 through a resistor 50 shunted by a capacitor 51 and the stage 21 is coupled to the stage 22 through a resistor 52 shunted by a capacitor 53. The cathode of the stage 21 is connected to the grounded side of the input and output circuits of the D. C. amplifier. A —300 v. lead 54 is connected directly to the cathode of the stage 22 and through a resistor 55 to the two cathodes of the stage 20.

With these conditions, the stabilization voltage $a_{g2}$ functions to vary the voltage drop of the resistor 55 and the potential of the cathodes in such a way that the input, $e_1$, and output, $e_o$, of the D. C. amplifier will have a zero value simultaneously by causing $e_{g1}$ to be zero at all times.

The modification of Fig. 2 is similar to that of Figs. 1 and 3 in most respects. It differs therefrom in that the output potential $e_o$ is taken off the resistor 56 of a cathode follower 57 which is responsive to the output of the D. C. amplifier 17. In this case, the output voltage $e_o$ is fed back in series with the input voltage $e_1$. With sufficient gain in the D. C. amplifier and the zero stabilization circuits, the voltage $e_{g1}$ may be made as near zero as desired. Under these conditions $e_o$ will be very nearly equal to $e_1$.

What the invention provides is an improved circuit which (1) is readily adapted to operate as a D. C. amplifier, a differentiator or an integrator and (2) is continuously and automatically stabilized so that its input and output voltages will always have their zero values at the same time. The invention further provides that the high frequency response characteristics of said amplifier will be substantially unaffected by such means for stabilizing for D. C. drift and zero.

What we claim is:

1. In a circuit for continuously and automatically stabilizing a D. C. amplifier of the type having first and second input circuits and an output circuit, the combination of means to apply a signal voltage to said first input circuit, inverse feedback means connected between said output circuit and said first input circuit whereby a D. C. error voltage is produced at said first input circuit, means coupled to said first input circuit and responsive to said D. C. error voltage at said first input circuit for converting said error voltage to a voltage varying in value at a predetermined rate, an A. C. amplifier having its input connected to said converting means to amplify and to invert the polarity of said varying voltage, means independent of said converting means connected between the output of said A. C. amplifier and said second input circuit for synchronously rectifying the output of said A. C. amplifier and applying to said second input circuit a D. C. stabilizing voltage.

2. In a circuit for continuously and automatically stabilizing a D. C. amplifier of the type having first and second input circuits and an output circuit, the combination of means to apply a signal voltage to said first input circuit, inverse feedback means connected between said output circuit and said first input circuit whereby a D. C. error voltage is produced at said first input circuit, a vibrator having two fixed contacts and a movable contact, said fixed contacts being connected to said first input circuit for converting said error voltage at said first input circuit to a voltage varying in value at a predetermined frequency, A. C. amplifying means connected to said movable contact of said vibrator to amplify and to invert the polarity of said varying voltage, means including a synchronous rectifier connected between said A. C. amplifying means and said second input circuit for applying a D. C. stabilizing voltage to said second input circuit to develop in said D. C. amplifier a D. C. voltage to cancel said error voltage.

3. The combination of a D. C. amplifier having an output circuit and having an input stage including a duo-triode with a resistor common to both its cathode leads, means to apply a voltage to the grid of the first of said triodes, means coupling said duo-triode to said output circuit, a feedback connection between said output circuit and the grid of the first of said triodes, a vibrator having a pair of fixed contacts and a movable contact, one of said fixed contacts being coupled to the grid of the first of said triodes, a source of reference potential connected to the other of said fixed contacts, means including said vibrator to generate an A. C. voltage proportional to the D. C. voltage at the grid of said first triode, an A. C. amplifier coupled to said movable contact of said vibrator and responsive to the A. C. output voltage of said vibrator, and means including a synchronous rectifier responsive to the output of said A. C. amplifier for applying to the grid of said second of the said triodes a stabilizing voltage such that the input and the output voltages of said D. C. amplifier are zero at the same time.

4. In a system for continuously and automatically stabilizing a D. C. amplifier having a first input circuit adapted to be connected to a source of signals to be amplified and having a second input circuit and an output circuit, inverse feedback means for coupling said output circuit to said first input circuit, in combination, a converter coupled to said first input circuit for converting D. C. voltage in said first input circuit to A. C. voltage, an A. C. amplifier coupled to said converter to amplify said A. C. voltage, a rectifier connected to said A. C. amplifier to convert A. C. voltage obtained from said A. C. amplifier to a second D. C. voltage, and means coupling said rectifier to said second input circuit to apply said second D. C. voltage to said second input circuit to develop in said output circuit a D. C. voltage of polarity opposite to that of said first-named D. C. voltage, said converter comprising a vibrator having a pair of fixed contacts and a movable contact adapted to contact said fixed contacts alternately, one of said fixed contacts being connected to said first input circuit, a source of reference potential being connected to the other of said fixed contacts, and said movable contact being connected to said A. C. amplifier.

5. A D. C. amplifier comprising a first input circuit adapted to be connected to a source of signals to be amplified, an output circuit, direct-current-coupled amplifying means connecting said circuits, an inverse feedback network connecting said circuits, a second input circuit connected to said amplifying means intermediate said first input circuit and said output circuit, converter means connected to said input circuit to convert D. C. voltage obtained at said first input circuit to A. C. voltage, an A. C. amplifier connected to said converter, a rectifier connected to said A. C. amplifier to convert A. C. voltage obtained from said A. C. amplifier to D. C. voltage, and connections from said rectifier to said second input circuit to apply said last named D. C. voltage to said second input circuit, said converter means comprising a vibrator having a pair of fixed contacts and a movable contact adapted to contact said fixed contacts alternately, one of said fixed contacts being connected to said first input circuit, a source of reference potential being connected to the other of said fixed contacts, and said movable contact being connected to said A. C. amplifier.

6. A D. C. amplifier having an input circuit and an output circuit, an inverse feedback network connecting said circuits, means coupled to said input circuit to convert D. C. voltage obtained at said input circuit to alternating voltage, an A. C. amplifier connected to said converting means to amplify said alternating voltage, a rectifier connected to said A. C. amplifier to convert amplified alternating output voltage obtained from said A. C. amplifier to unidirectional voltage, a second input circuit for said D. C. amplifier, and connections to apply D. C. voltage from said rectifier to said second input circuit to develop in said output circuit a D. C. voltage of polarity opposite to that of said first named D. C. voltage, said converting means comprising a vibrator having a pair of fixed contacts and a movable contact adapted to contact said fixed contacts alternately, one of said fixed contacts being connected to said input circuit, a source of reference potential being connected to the other of said fixed contacts, and said movable contact being connected to said A. C. amplifier.

7. In a D. C. amplifier of the type having an input stage including an electron tube having a cathode and a control grid and having an output stage coupled to said grid of said input stage by an inverse feedback network, the combination with said amplifier of means to apply a signal voltage to said grid of said input tube, means connected to said input stage to convert D. C. voltage at the grid of said input tube to an alternating voltage, an A. C. amplifier connected to said converting means to amplify said alternating voltage, means connected to said A. C. amplifier to rectify the amplified A. C. output voltage thereof, and means coupling said rectifying means to said input stage to vary the grid-to-cathode voltage of said tube as a function of the output voltage of said rectifying means, said converting means comprising a vibrator having a pair of fixed contacts and a movable contact adapted to contact said fixed contacts alternately, one of said fixed contacts being connected to said input stage, a source of reference potential being connected to the other of said fixed contacts, and said movable contact being connected to said A. C. amplifier.

References Cited in the file of this patent

UNITED STATES PATENTS

| Number | Name | Date |
|---|---|---|
| 2,190,743 | Vance | Feb. 20, 1940 |
| 2,297,543 | Eberhardt | Sept. 29, 1942 |
| 2,455,711 | Sziklai | Dec. 7, 1948 |
| 2,459,177 | Moseley | Jan. 18, 1949 |
| 2,485,665 | Shepherd | Oct. 25, 1949 |
| 2,536,617 | Weller | Jan. 2, 1951 |